US009639374B2

(12) United States Patent
Divakaran et al.

(10) Patent No.: US 9,639,374 B2
(45) Date of Patent: May 2, 2017

(54) SYSTEM AND METHOD THEREOF TO OPTIMIZE BOOT TIME OF COMPUTERS HAVING MULTIPLE CPU'S

(71) Applicant: Huawei Technologies Co., Ltd., Shenzhen, Guangdong (CN)

(72) Inventors: Nair Sanil Kumar Divakaran, Bangalore (IN); Aman Shahi, Bangalore (IN); Shayori Das, Bangalore (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 199 days.

(21) Appl. No.: 14/734,660

(22) Filed: Jun. 9, 2015

(65) Prior Publication Data

US 2015/0339129 A1 Nov. 26, 2015

Related U.S. Application Data

(63) Continuation of application No. PCT/CN2014/089760, filed on Oct. 29, 2014.

(30) Foreign Application Priority Data

May 9, 2014 (IN) ............................ 2355/CHE/2014

(51) Int. Cl.
*G06F 9/44* (2006.01)
*G06F 9/48* (2006.01)

(52) U.S. Cl.
CPC .............. *G06F 9/4405* (2013.01); *G06F 9/48* (2013.01); *G06F 9/4881* (2013.01)

(58) Field of Classification Search
CPC .......... G06F 9/4405; G06F 9/48; G06F 9/4881
See application file for complete search history.

(56) References Cited

U.S. PATENT DOCUMENTS

| 6,158,000 | A | 12/2000 | Collins |
| 6,336,185 | B1 | 1/2002 | Sargenti et al. |
| 6,732,264 | B1 | 5/2004 | Sun et al. |
| 7,987,336 | B2 | 7/2011 | Kirscht et al. |

(Continued)

FOREIGN PATENT DOCUMENTS

| CN | 102648453 A | 8/2012 |
| WO | WO 2014/139177 A1 | 9/2014 |

OTHER PUBLICATIONS

"UpstartHowto", Jan. 28, 2013, 3 pages.

(Continued)

*Primary Examiner* — Meng An
*Assistant Examiner* — Jorge A Chu Joy-Davila

(57) ABSTRACT

A method and system is provided for optimizing a boot time of a computer system with at least one CPU, in response to a boot command. The system includes memory and a processor. The processor executes instructions stored in the memory to access a task description chart (TDC) comprising essential tasks related to the booting of the system. The TDC is processed offline to create two sets of scheduling charts: an independent task chart (ITC) and a dependent task chart (DTC). The ITC includes all the independent tasks and the DTC includes all the dependent tasks. The DTC is further divided into DTC1 and DTC2. The tasks from all the charts are selected for execution based on priority. The method and system solve the scheduling overhead problem during the boot process, by optimizing the scheduling.

20 Claims, 13 Drawing Sheets

(56) References Cited

U.S. PATENT DOCUMENTS

2003/0009508 A1    1/2003    Troia et al.
2005/0038981 A1    2/2005    Connor et al.
2007/0204271 A1    8/2007    Gaiarsa
2011/0126209 A1    5/2011    Housty
2013/0198760 A1    8/2013    Cuadra et al.

OTHER PUBLICATIONS

"Upstart Intro, Cookbook and Best Practices", Nov. 5, 2014, 221 pages.
"Optimize Windows for SSDs", thomas-krenn.com, 5 pages.
"Prefetcher", Wikipedia, Sep. 7, 2015, 4 pages.
"Readhead reloaded", Red Hat, Inc., Sep. 7, 2008, 2 pages.
"readahead", Wikipedia, Feb. 15, 2015, 1 page.
Faheem Sheikh, et al., "Booting an RTOS on symmetric multiprocessors", Sep. 3, 2010, 8 pages.

PRIOR-ART

PRIOR-ART-
(PCT/CN2013/072764)

| Selection info / Task | Status | Priority | Dependency |
|---|---|---|---|
| Task 1 | Uncompleted | 1 | None |
| Task 2 | Uncompleted | 2 | Task 1 |
| Task 3 | Uncompleted | 3 | None |

SYSTEM AND METHOD THEREOF TO OPTIMIZE BOOT TIME OF COMPUTERS HAVING MULTIPLE CPU'S

CROSS-REFERENCE TO RELATED APPLICATIONS

This application is a continuation of International Application No. PCT/CN2014/089760, filed on Oct. 29, 2014, which claims priority to India Patent Application No. IN2355/CHE/2014, filed on May 9, 2014, both of which are hereby incorporated by reference in their entireties.

TECHNICAL FIELD

The present invention generally relates to the field of computers, and more particularly, to an optimized method of and system for booting computers having multiple Central Processing Units (CPUs).

BACKGROUND

Workstations, personal computers, and/or servers (hereinafter referred to as "computer systems" or "computers") normally include a basic input/output system (BIOS) which acts as an interface between a hardware of computer and at least one operating system (OS) installed on that computer. The BIOS may further have at least one software code and/or a firmware and/or instructions to trigger and initialize the hardware services of the computer, such as chipset drivers, video, basic keyboard, I/O port, disk drive, and the like service of motherboard. Apart from the initialization of services, the BIOS may also seek for the hardware related to peripheral cards that may include but not limited to PCI cards, and the controllers that resides on the peripheral cards. The BIOS instructions and/or firmware and/or instructions are normally stored on a flash memory of the computer that is stored in a location that is read and processed by a processor of the computer when the computer system is switched-on. The BIOS instructions are also initialized at the same time when the computer system is switched/powered-on.

Further, the flash memory of the computer may also include software that is specifically used to check the specific hardware present on the system. When the system is powered-on the software executes a power on self test (POST) to check the hardware present in the computer system. A disk drive POST from a cold boot and a random access memory (RAM) power on self test (POST) may also be performed by the processor based on the instructions of the software in the flash memory, otherwise the software may also instruct the processor to skip the POST for one or more hardware devices during a boot, in order to reduce the boot time of the system.

A typical boot process in a traditional computer system is shown in FIG. 1. As shown in the FIG. 1, when the system in powered on, the booting starts at the BIOS. The BIOS perform a power on self test (POST) that initializes all the devices including the RAM, the CPU and other devices like keyboard, monitor, and the like. If it is a multi-core or multi-processor system then one CPU is determined to be the boot CPU which executes the BIOS and a kernel initialization code. The remaining processors often called application processors (AP) remains idle till they are initialized by the kernel of an operating system (OS) at a later time. Once the BIOS initialization is done, then the boot device is located and a boot loader is loaded to the RAM and the control is passed to it. The boot loader determines which kernel of OS to boot from, loads the determined OS to RAM and passes the control to it. When the kernel of the OS starts executing, it initializes it resources and data structures that may include but not limited to the initialization of remaining application processors and finally executes the Init Scripts which initializes all the services of the computer system.

Conventionally, the computer systems execute the booting process in sequential manner by the use of single CPU. In order to optimize the boot time in the sequential processing there are various methods used presently. Few of the existing methods to optimize the boot time are mentioned below:

1. Reducing a Boot/an operating system size.
2. A multithreaded execution of initialization of at least one routine of the services, and/or init scripts.
3. Hardware assisted/an accelerated boot steps that uses faster cache/storage device.
4. A parallel execution of some boot steps using a multiprocessor/multi-core. In this boot processor/core dispatches certain block of the tasks of the BIOS to other core's to execute them in parallel. The boot processor/the core waits/polls for other core's to complete their task, then continue with the boot process. FIG. 2 shown a parallelization of BIOS/Init scripts.
5. Snapshot booting method.

Though, all the above mentioned methods are used to optimize the boot time of the computer system, they still have a massive drawback of an amount of time that is spent in the booting process, and reducing the booting time.

To avoid the above mentioned drawbacks, and to provide a boot time optimization, a "Booting method for computer system with multiple central processing units" was proposed in a patent application PCT/CN2013/072764 by "Huawei Technologies Co., Ltd" in 2012. In PCT/CN2013/072764, the booting method for computer system with multiple central processing units, which provides a framework for parallel execution of entire boot process using Task Description Chart (TDC), is disclosed. The TDC includes all the tasks that are essentially to be performed for proper working of any computer system. The complete parallelization of whole boot process of booting is disclosed in the prior-art. In PCT/CN2013/072764, the scheduler depends on the TDC of the target. The actual scheduling happens during the boot-up. A priority, dependency and a task status checks are made during task scheduling. FIG. 3 shows a parallel boot method on a multiple cores/processors.

Even though the prior system as disclosed in PCT/CN2013/072764 is used for optimization of boot time by providing a parallel execution of entire boot process, still there are drawbacks for the disclosed method. Few of the drawbacks are mentioned below:

1. As the priority, dependency and the task status checks are made during task scheduling, this adds performance overhead onto the system.
2. When the number of boot time tasks is high, this normally is the case in many systems, the overhead for scheduling increases.
3. Scheduling happens on the target and hence adds overhead to the boot process.
4. The dependency checks are done on the target, this also adds overhead to the boot process.
5. The memory requirements are considered on the target, this may add certain overhead to the boot process management.

6. Also, the complete utilization of the cores may be hindered due to the dependency check and online scheduling decisions.

While the techniques for optimization in boot process time are growing, there still exists a need to optimize boot time of computers having multiple CPUs. Accordingly, what would be desirable, but has not yet been provided, is an optimized method of and system for booting computers having multiple central processing units (CPUs) with reduced overheads and less booting time.

SUMMARY

This summary is provided to introduce concepts related to a system and method thereof to optimize boot time of computers having multiple central processing units (CPUs) with reduced overheads, less booting time and the concepts are further described below in the detailed description. This summary is not intended to identify essential features of the claimed subject matter nor is it intended for use in determining or limiting the scope of the claimed subject matter.

The above-described problems are addressed and a technical solution is achieved in the present invention by providing an optimized method of and system for booting computers having multiple central processing units (CPUs) with reduced overheads and less booting time.

It is therefore a primary object of the present invention to provide an optimized method of and system for booting computers having multiple Central Processing Units (CPUs) with reduced overheads and less booting time.

Accordingly, in one embodiment of the present invention, a computer implemented method for booting a computer system with multiple Central Processing Units (CPUs), which when executed by multiple initialized CPUs of the multiple CPUs is disclosed. The computer implemented method may work in response to a boot command, which is initiated when a computer system is powered-on. In accordance with the method, a task description chart (TDC) stored in the computer system is accessed. The accessed TDC may include, address information and selection information of a plurality of tasks of a booting process. The plurality of tasks may include all the tasks that are essentially to be performed for proper working of the computer system. The TDC accessed is categorized based on the dependency of the plurality of tasks in the TDC. The TDC is categorized to generate an independent task chart (ITC) and a dependent task chart (DTC). The ITC comprises of a set of tasks independent of other tasks. The DTC comprises of a set of tasks having at least one dependency on another task of the TDC. The method further includes the categorization of DTC into a dependent task chart 1 (DTC 1) and a dependent task chart 2 (DTC 2). The DTC 1 comprises of the set of tasks from the DTC having at least one dependency on at least one task selected from the set of tasks of the ITC. The DTC 2 comprises of the set of tasks from the DTC having at least one dependency on at least one task selected from the set of tasks of the DTC 1 or at least one task selected from the set of tasks of the DTC 2.

In accordance with the method, the at least one task from the ITC is selected for execution. At least one task from the ITC is selected based on the priority of the task with respect to the other tasks in the ITC, as all the tasks are arranged in based on the priority. The selected at least one task is checked if it is executed already or not. If the task is not executed previously, the task is executed and then the next task based on the priority is selected from ITC for execution. If the task is executed already, the next task based on the priority is selected from the ITC. The task execution status may be fetched from a status bit register which stores all the information of the tasks executions.

After the execution of all the tasks from the ITC, the method selects the tasks from the DTC 1. All the tasks from the DTC 1 are selected based on the selection information of the task, and more specifically the priority of the tasks in the DTC 1. The priority of the DTC 1 is based on the dependency of the tasks from DTC 1 on the ITC. The method selects the at least one task from the DTC 1 and checks if the selected task is already executed or not. If the task is not executed previously, the task is executed and then the next task is selected from DTC 1 for execution. If the task is executed already, the next task based on the priority is selected from the DTC 1. Accordingly the status bit register is checked for the unexecuted tasks.

In one implementation, the DTC 1 tasks are arranged based on the priority. The tasks in DTC1 have dependency only on tasks in ITC. Hence, during the execution of tasks in DTC 1, the tasks are arranged in priority and hence, the scheduler can just pop the tasks and execute. No other checks are required. The tasks are executed based on the bitmasks maintained in the status bit register and hence, are executed in much faster rate. The detailed working will be explained in the section below.

After the execution of all the tasks from the DTC 1, the method selects the tasks from the DTC 2. All the tasks from the DTC 2 are selected based on the selection information of the task, and more specifically the priority of the tasks in the DTC 2. The priority of the DTC 2 is based on the dependency of the tasks from DTC 2 on the DTC 1 and DTC 2. The method selects the at least one task from the DTC 2 and checks if the selected task is already executed or not. If the task is not executed previously, the task is executed and then the next task based on the priority is selected from DTC 2 for execution. If the task is executed already, the next task based on the priority is selected from the DTC 2. Accordingly the status bit register is checked for the unexecuted tasks.

In another embodiment of the present invention, a computer system for optimizing a boot time of the computer system with multiple Central Processing Units (CPUs), which when executed by multiple initialized CPUs of the multiple CPUs is disclosed. The computer system may work in response to a boot command, which is initiated when the computer system is powered-on. The system comprises of multiple Central Processing Units (CPUs), which when executed by multiple initialized CPUs of the multiple CPUs coupled to memory. The memory may have a plurality of instructions stored in it. The instructions are executed using the multiple Central Processing Units (CPUs) coupled to the memory. In accordance with the system, the instructions when initiated during the boot time causes the multiple Central Processing Units (CPUs) to access a task description chart (TDC) stored in the computer system. The accessed TDC may include, address information and selection information of a plurality of tasks of a booting process. The plurality of tasks may include all the tasks that are essentially to be performed for proper working of the computer system. The TDC accessed is categorized based on the dependency of the plurality of tasks in the TDC. The TDC is categorized to generate an independent task chart (ITC) and a dependent task chart (DTC). The ITC comprises of a set of tasks independent of other tasks. The DTC comprises of a set of tasks having at least one dependency on another task of the TDC. The system further categorizes the DTC into a dependent task chart 1 (DTC 1) and a dependent task chart 2 (DTC 2). The DTC 1 comprises of the set of tasks from the DTC having at least one dependency on at least one task selected from the set of tasks of the ITC. The DTC 2 comprises of the set of tasks from the DTC having at least one dependency on at least one task selected from the set of tasks of the DTC 1 or at least one task selected from the set of tasks of the DTC 2.

In accordance with the system, the at least one task from the ITC is selected for execution. The at least one task from the ITC is selected based on the selection information and more specifically based on the priority of the task with respect to the other tasks in the ITC. The selected at least one task is checked if it is executed already or not. If the task is not executed previously, the task is executed and then the next task based on the priority is selected from ITC for execution. If the task is executed already, the next task based on the priority is selected from the ITC. The task execution status may be fetched from a status bit register which stores all the information of the tasks executions.

After the execution of all the tasks from the ITC, the system selects the tasks from the DTC 1. All the tasks from the DTC 1 are selected based on the selection information of the task, and more specifically the priority of the tasks in the DTC 1. The priority of the DTC 1 is based on the dependency of the tasks from DTC 1 on the ITC. The system selects the at least one task from the DTC 1 and checks if the selected task is already executed or not. If the task is not executed previously, the task is executed and then the next task based on the priority is selected from DTC 1 for execution. If the task is executed already, the next task based on the priority is selected from the DTC 1. Accordingly the status bit register is checked for the unexecuted tasks.

After the execution of all the tasks from the DTC 1, the system selects the tasks from the DTC 2. All the tasks from the DTC 2 are selected based on the selection information of the task, and more specifically the priority of the tasks in the DTC 2. The priority of the DTC 2 is based on the dependency of the tasks from DTC 2 on the DTC 1 and DTC 2. The system selects the at least one task from the DTC 2 and checks if the selected task is already executed or not. If the task is not executed previously, the task is executed and then the next task based on the priority is selected from DTC 2 for execution. If the task is executed already, the next task based on the priority is selected from the DTC 2. Accordingly the status bit register is checked for the unexecuted tasks.

In another embodiment of the present invention, the different variants of ITC/DTC may be created offline. In one example, the proposed system may create the DTC with only interdependent tasks. Hence, these set of tasks can be completely managed within the same list and distribute on some specific CPU core based on the system. If the system has 8 cores and the DTC may be handled on core 6 and 7 and may be decided by the system or user dynamically. These decisions may be taken offline.

Though the concept of ITC and DTC are given to illustrate the specific issues, the variants of DTC are clear possibility to optimize the scheduling based on the systems. These and other features and advantages will become apparent from the following detailed description of illustrative embodiments thereof, which is to be read in connection with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

Corresponding reference characters indicate corresponding parts throughout the several views. The exemplification set out herein illustrates preferred embodiments of the invention, in one form, and such exemplification is not to be construed as limiting the scope of the invention in any manner.

FIG. 1 illustrates a general boot process when any existing system is powered-on;

Figure 1:
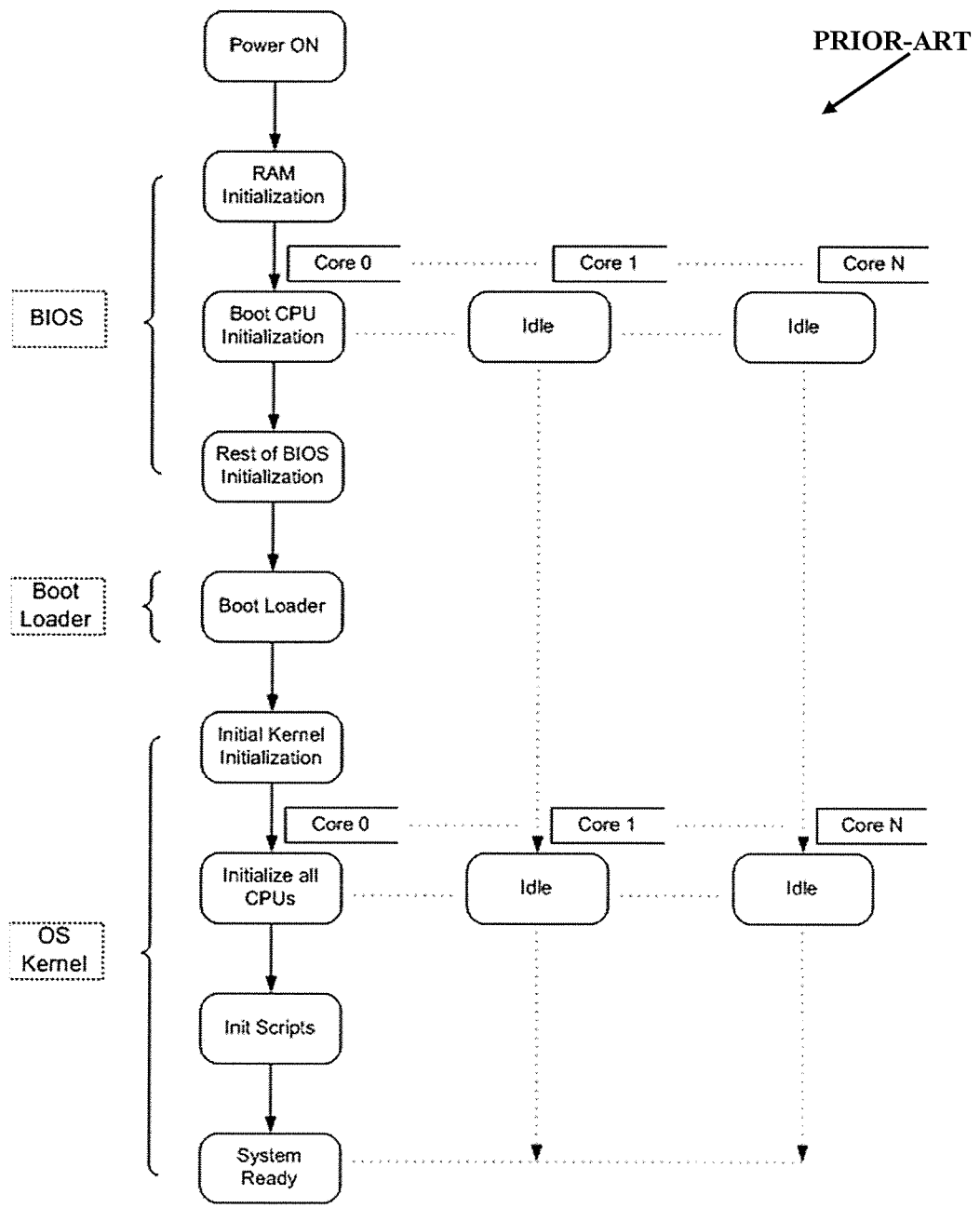

It is to be understood that the attached drawings are for purposes of illustrating the concepts of the invention and may not be to scale.

DETAILED DESCRIPTION

In order to make the aforementioned objectives, technical solutions and advantages of the present application more comprehensible, embodiments are described below with accompanying figures.

The objects, advantages and other novel features of the present invention will be apparent to those skilled in the art from the following detailed description when read in conjunction with the appended claims and accompanying drawings.

It is to be understood that, traditionally when the computer system is powered on, the BIOS performs a power on self test (POST) that initializes devices including Random Access Memory (RAM), processor, keyboard, and monitor etc. Normally, a processor in a computer system is a functional hardware unit that includes single CPU or multiple CPUs (often called single-core processor or multi-core processor). Or, a computer system may include multiple processors. If the computer system includes multiple CPUs (e.g., in the forms of multi-processor system or multi-core processor system), one of the CPUs may be determined to be a "boot CPU" which executes the BIOS initialization codes and kernel initialization codes for the booting process. The remaining CPUs (often called application processors (APs)) remain idle till the OS starts executing. Once the BIOS initialization is done, a boot device is identified and the boot loader is loaded from the boot device to the RAM and control is passed to the boot loader. The boot loader determines which OS (e.g. kernel) to boot loads the determined OS from the boot device to the RAM and passes the control to the OS. Once the OS starts executing, it initializes resources and data structure, the remaining CPUs and executes an initial script which initializes various services.

Systems and methods for booting a computer system with at least one central processing unit (CPU), in response to a boot command are described. A TDC which may be already stored in the memory of a computer system is accessed and processed by multiple Central Processing Units (CPUs) 604, which when executed by multiple initialized CPUs of the multiple CPUs of the proposed computer system.

The accessed TDC may include, address information and selection information of a plurality of tasks of a booting process. The plurality of tasks may include all the tasks that are to be performed essentially for proper working of the computer system. The system categorizes the TDC based on the dependency of the plurality of tasks in the TDC. The TDC may be categorized offline to create two sets of scheduling charts, to generate an independent task chart (ITC) and a dependent task chart (DTC). The ITC comprises of a set of tasks independent of other tasks and the DTC comprises of a set of tasks having at least one dependency on another task of the TDC.

The DTC may be further categorized into a dependent task char 1 (DTC 1) and a dependent task chart 2 (DTC 2) based on the dependency of the DTC on ITC or other tasks available in the TDC. The DTC 1 may include the set of tasks from the DTC having at least one dependency on at least one task of the ITC and the DTC 2 may include the set of tasks from the DTC having at least one dependency on at least one task of the DTC 1 or at least one task of the DTC 2.

The system selects the at least one task from the ITC for execution, as these tasks are essential tasks which are required for safe and normal working of the computer system. The at least one task from the ITC is selected based on the selection information and more specifically based on the priority of the task with respect to the other tasks in the ITC. The tasks may be arranged in the queue based on the priority information. The selected task is checked if it is executed already or not. If the task is not executed already, the task is selected and executed, and then the next task based on the priority is selected from ITC for execution. If the task is executed already, the next task based on the priority is selected from the ITC. The task execution status may be retrieved from a status bit register which stores all the information of the tasks executions. The tasks may be available in the queue so the system may fetch the next tasks easily from it.

After the execution of all the tasks from the ITC, the system selects the tasks from the DTC 1. All the tasks from the DTC 1 are selected based on the selection information of the task, and more specifically the priority of the tasks in the DTC 1. The priority of the DTC 1 is based on the dependency of the tasks from DTC 1 on the ITC. In one example, the tasks which are dependent on the task of the ITC may be executed first that the next tasks in priority of the ITC. The system selects the at least one task from the DTC 1 and checks if the selected task is already executed or not. If the task is not executed previously, the task is executed and then the next task based on the priority is selected from DTC 1 for execution. If the task is executed already, the next task based on the priority is selected from the DTC 1. Accordingly the status bit register may be checked for the unexecuted tasks.

After the execution of all the tasks from the DTC 1, the system selects the tasks from the DTC 2. All the tasks from the DTC 2 are selected based on the selection information of the task, and more specifically the priority of the tasks in the DTC 2. The priority of the DTC 2 is based on the dependency of the tasks from DTC 2 on the DTC 1 and DTC 2. The system selects the at least one task from the DTC 2 and checks if the selected task is already executed or not. If the task is not executed previously, the task is executed and then the next task based on the priority is selected from DTC 2 for execution. If the task is executed already, the next task based on the priority is selected from the DTC 2. Accordingly the status bit register is checked for the unexecuted tasks.

As the proposed invention is related to optimize a scheduling of parallel boot framework by providing offline scheduling algorithm, in one example, the TDC may be accessed by only one CPU at a time. The selection information may include a priority field representing a priority of the plurality of tasks and the at least one task from the plurality of tasks is selected based on ascending order of the priority by the at least one CPU. The selection information may also include a dependency field, a lock field, and a status field. All the tasks in the TDC may be categorized based on the dependency of the plurality of tasks. All the tasks in the ITC and DTC are arranged and executed in an ascending order of the priority of the set of tasks independent of other tasks. The other tasks on which the tasks of DTC may be dependent on may be any task of DTC 1 or DTC 2 or may be from the ITC. All the tasks present in the ITC are executed first, therein after the tasks of DTC 1 and then the tasks of DTC 2 are executed.

While aspects of described system and method for booting a computer system with at least one central processing unit (CPU), in response to a boot command, may be implemented in any number of different computing systems, environments, and/or configurations, the embodiments are described in the context of the following exemplary system.

While illustrative embodiments of the present invention are described below, it will be appreciated that the present invention may be practiced without the specified details, and that numerous implementation-specific decisions may be made to the invention described herein to achieve the developer's specific goals, such as compliance with system-related and business-related constraints, which will vary from one system to other system such a development effort might be complex and time-consuming, it would nevertheless be a routine undertaking for those of ordinary skill in the art having the benefit of this disclosure. For example, selected aspects are shown in block diagram form, rather than in detail, in order to avoid obscuring or unduly limiting the present invention. Such descriptions and representations are used by those skilled in the art to describe and convey the substance of their work to others skilled in the art. The present invention will now be described with reference to the drawings described below.

In the complete parallelization of whole boot process, the application PCT/CN2013/072764 is the primary prior art for the current invention. In all the subsequent sections the improvement or optimization on top of PCT/CN2013/072764 will be described. The descriptions and representations of the present invention mentioned below may also include the comparison of the present invention with the PCT/CN2013/072764.

FIG. 1 illustrates a general boot process when any existing system is powered-on.

Figure 2:
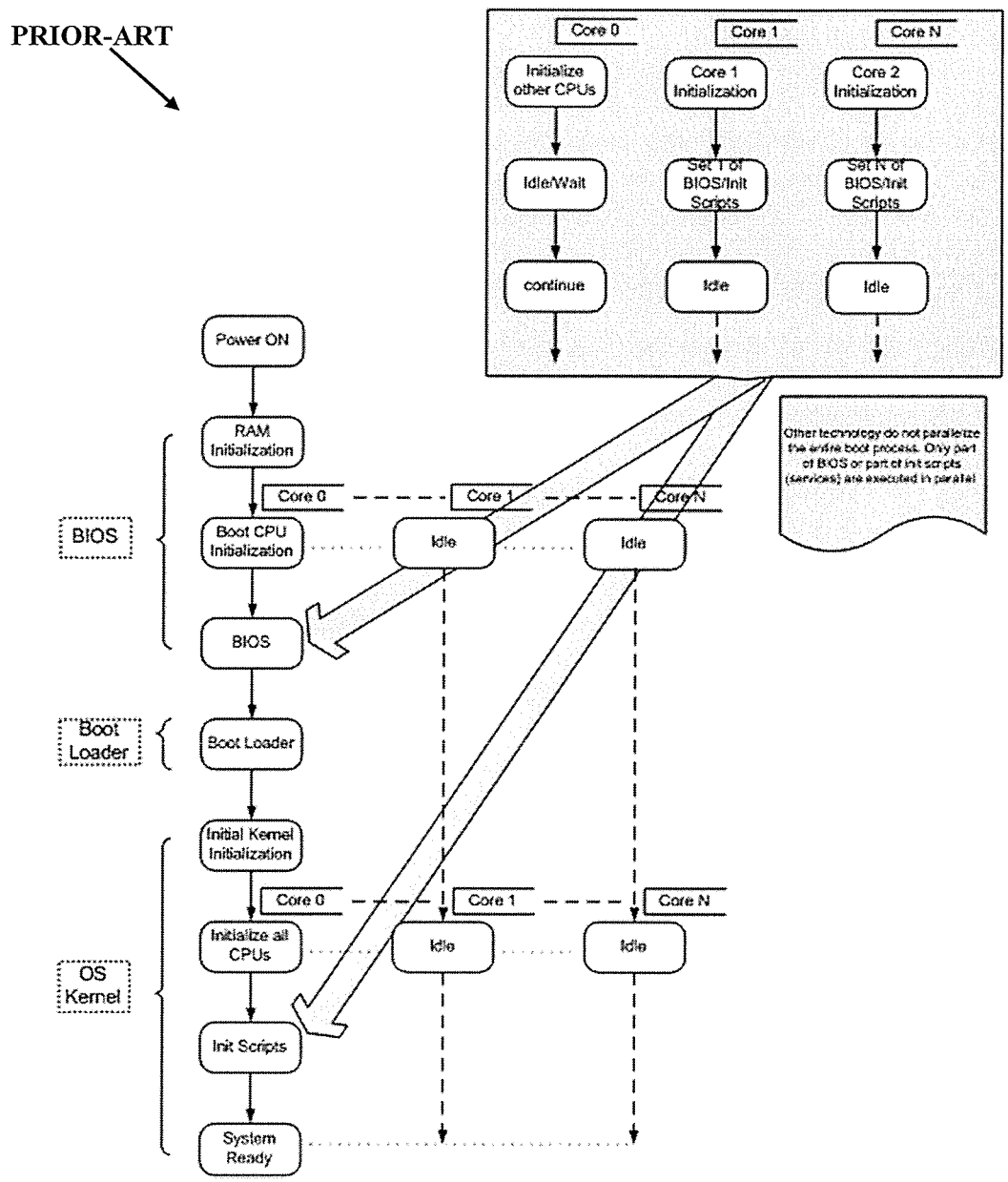
FIG. 2 illustrates a parallelization of BIOS/Init script in optimization of boot time in the existing system.

FIG. 2 illustrates a parallelization of BIOS/Init script in optimization of boot time.

Figure 3:
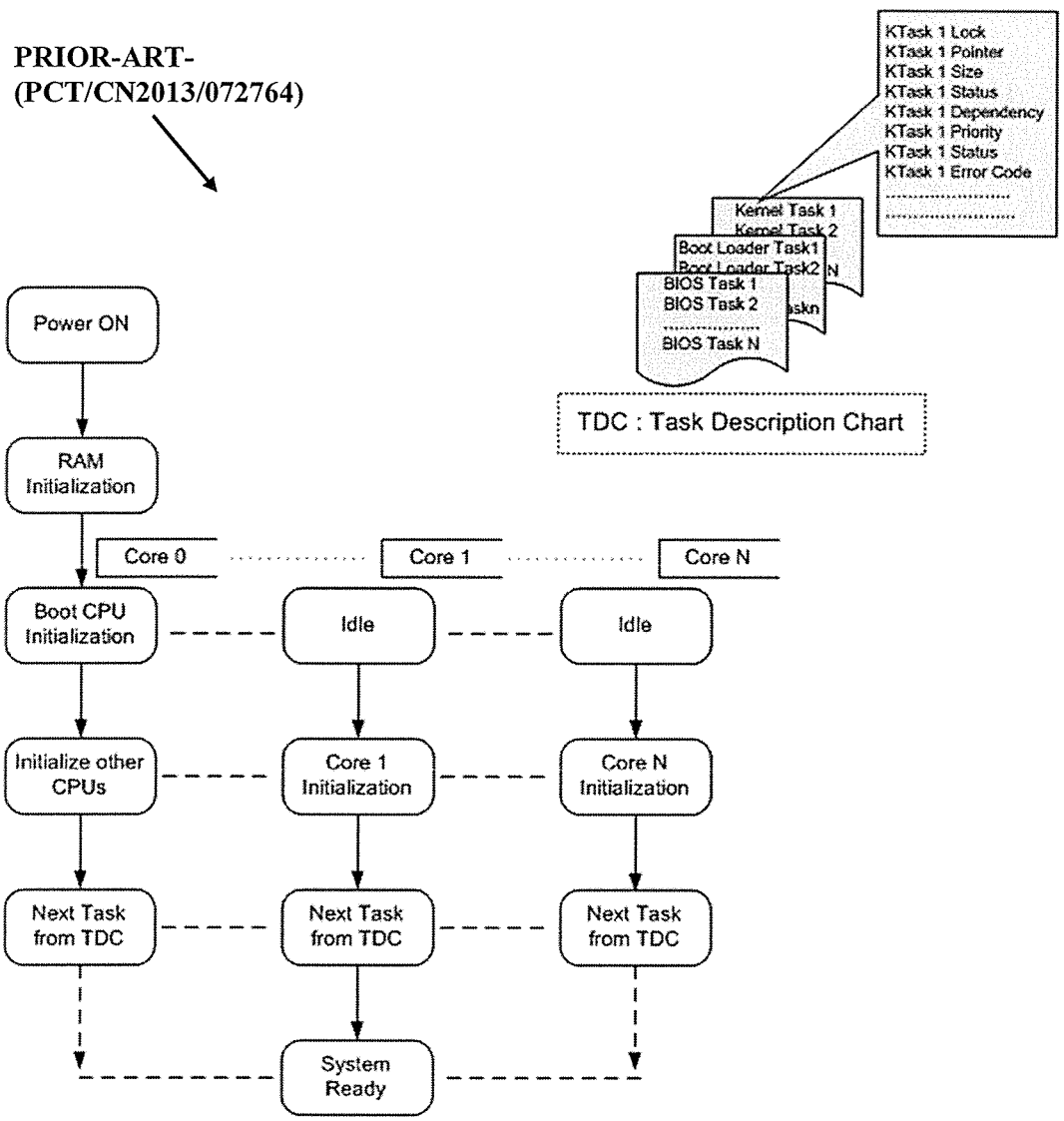
FIG. 3 illustrates a parallel boot method on multiple cores/processors as disclosed in PCT/CN2013/072764.

FIG. 3 illustrates a parallel boot method on multiple cores/processors as disclosed in PCT/CN2013/072764

Figure 4:
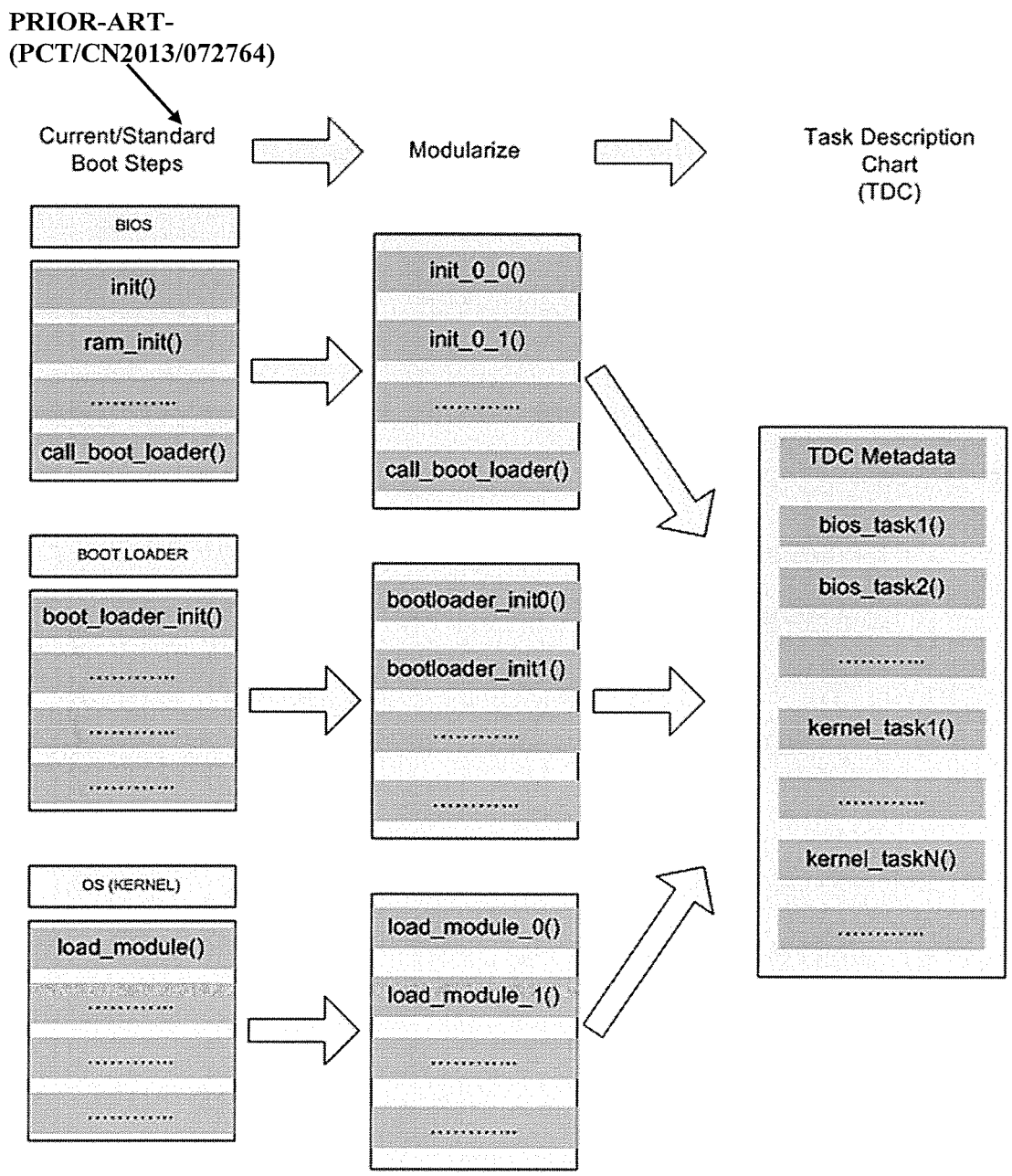
FIG. 4 illustrates an offline creation of TDC for a booting process processors as disclosed in PCT/CN2013/072764.

Referring now to FIG. 4, a method for creation of a task description chart (TDC) is shown. It is well understood by a person skilled in the art that the creation of a TDC may require three modules, which may include but not limited to a BIOS module, a Boot loader and/or OD kernel. As disclosed in PCT/CN2013/072764, the TDC describing the essential operation of the computer tasks may be generated according to at least one following attributes of each task: priority, dependency, address, size, error code, lock, status and the dependency. Further, it is also know to the person skilled in the art that, if the computer system includes multiple CPUs (e.g. in the forms of multi-processor system or multi-core processor system), one of the CPUs may be determined to be a "boot CPU" which executes the BIOS initialization codes and kernel initialization codes for the booting process. The remaining CPUs (often called application processors (APs)) remain idle till the OS starts executing. Once the BIOS initialization is done, a boot device is identified and the boot loader is loaded from the boot device to the RAM and control is passed to the boot loader. The boot loader determines which OS (e.g. kernel) to boot and loads the determined OS from the boot device to the RAM and passes the control to the OS. Once the OS starts executing, it initializes resources and data structure, the remaining CPUs and executes an initial script which initializes various services.

The process of TDC creation as disclosed in PCT/CN2013/072764 is described below. In order to implement the multi-CPU execution in the booting process, the steps of the three modules may be inter-arranged in a procedure called "modularize", i.e., each module may be broken into sections. Each section may include one or several independent or asynchronous steps. As shown in FIG. 4, for example, steps of init ( ) in the BIOS module may be broken into steps of init_0_0 ( ) and init_0_1 ( ) which are independent from each other. Another specific modularization example on BIOS module is also provided here. Peripheral devices initialization steps in the BIOS module are used to be executed sequentially as configuration registers can be modified by only one process at a given time/instance. In this embodiment, peripheral devices initialization steps may be broken into two smaller groups of steps: initialization steps for initializing a device other than modifying the configuration registers and register steps for modifying the configuration registers based on the initialization step. Thus, the initialization steps for initializing multiple peripheral devices can be executed by multiple CPUs in parallel, and the register steps with respect to the multiple peripheral devices may be executed by a CPU sequentially later when needed. Similar modularization may be implemented on the boot module and kernel module. For shared resources, it may be accessed by multiple CPUs using locks for synchronizing.

The modularized steps may then be separated out to form individual tasks. For example, the modularized steps in the BIOS module may be grouped into tasks of bios_task1 ( ) and bios_task2 ( ). At least two tasks of the grouped tasks may be simultaneously executable tasks. The sequence of the tasks may be determined according to a set priority of each task. For example, tasks from boot loader module may be set to be executed in parallel to tasks from BIOS module. Thus, tasks like copying of kernel and decompression may be achieved while the BIOS module completes its execution.

In an embodiment of the present invention, a task descriptor data structure is created based on each individual system. All the charts are created offline. The offline chart will contain the task information. The multiple charts may be created offline based on the task attributes. Hence, the scheduling on the target is optimized. In the prior art, a single task description chart created offline.

In one implementation, the input to the offline task table creation is a task list with all the attributes. This may be manually created based on the product architecture. The list created may be fed to software which can convert the information into data structures. The task list may be known for execution during the boot time. From this list, the data structure is created based priority and dependency. This offline data structure is used for boot time optimization.

Figure 5:
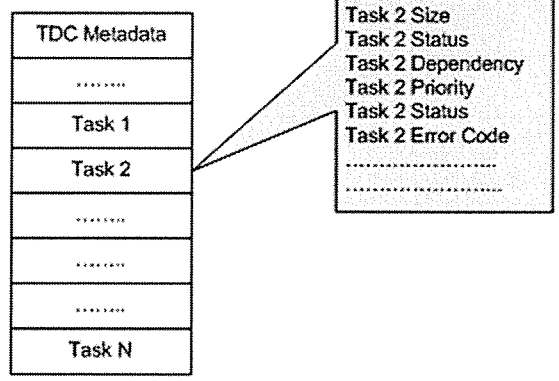
FIG. 5(a) illustrates a structure of TDC and its contents as disclosed in PCT/CN2013/072764.
FIG. 5(b) illustrates the selection information of the tasks as disclosed in PCT/CN2013/072764.

Referring now to FIG. 5(a), a structure of TDC and its contents are illustrated as disclosed in PCT/CN2013/072764. The TDC may be generated according to at least one following attributes of each task: priority, dependency, address, size, error code, lock, status and the dependency. In one example, the TDC includes address information and selection information of a plurality of tasks. During booting process, the CPU may select at least one task form the TDC based on the selection information that may be obtained from the RAM of the system. Based on the information obtained the task is executed by the processor. In one example, the TDC may include status, priority and dependency and the like fields related to the task, as the fields in it. The details of the selection information are disclosed in FIG. 5(b).

As disclosed in PCT/CN2013/072764, we need to lock the DPC and process each task based on the priority, etc. In accordance with the present disclosure, no other checks are needed and the tasks are arranged in different task charts (TDCs) based on the attributes that may include but not limited to independent, priority, etc. Hence, on the target or while executing the task by CPU scheduler can pop the task form the respective charts and execute the task.

Referring now to FIG. 5(b), the selection information of exemplary tasks 1 to 3 is shown. As disclosed in PCT/CN2013/072764, in case of multiple CPUs during the booting process, when any one CPU selects the TDC for execution, the tasks from the TDC are accessed based on the priority which is one filed in the TDC. The tasks may be available in queue form providing FIFO tasks based on the priority. The dependency field as shown in FIG. 5(b) indicates the dependency of the tasks on other tasks. Exemplary selection information in the table form is shown in FIG. 5(b).

Figure 6:
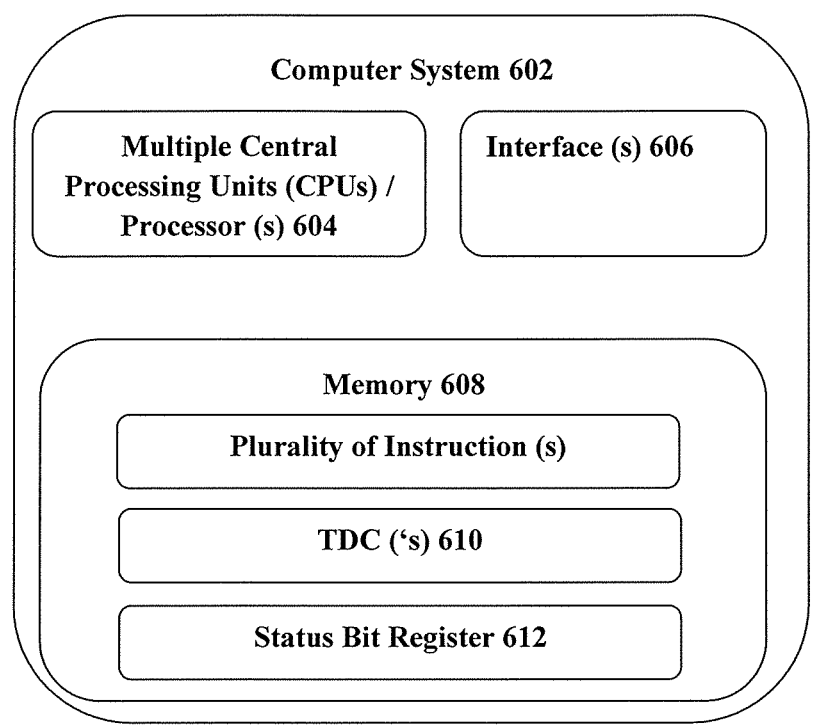
FIG. 6 illustrates a computer system in accordance with an embodiment of the present subject matter.

Referring now to FIG. 6, a computer system 602 for optimizing a boot time of the computer system 602 with at least one central processing unit (CPU) is disclosed. The computer system 602 may work in response to a boot command, which is initiated when the computer system is powered-on. The system 602 comprises of a multiple CPUs 604, which when executed by multiple initialized CPUs of the multiple CPUs coupled to a memory 608. The memory (608) may have a plurality of instructions stored in it. The instructions are executed using the multiple CPUs 604, are coupled to the memory 608.

In one embodiment, the computer system 602 may include multiple CPUs/processors 604 which may be multi-core processor; an interface (s) 606 may be an I/O interface, and a memory (s) 608. The at least one processor 604 may be implemented as one or more microprocessors, microcomputers, microcontrollers, digital signal processors, central processing units, state machines, logic circuitries, and/or other devices that manipulate signals based on operational instructions. Among other capabilities, the at least one processor 604 is configured to fetch and execute computer-readable instructions stored in the memory 608.

The I/O interface 606 may include a variety of software and hardware interfaces, for example, a web interface, a graphical user interface, and the like. The I/O interface 606 may allow the computer system 602 to interact with a user directly or through the client devices (not shown). Further, the I/O interface 606 may enable the computer system 602 to communicate with other computing devices, such as web servers and external data servers (not shown). The I/O interface 606 can facilitate multiple communications within a wide variety of networks and protocol types, including wired networks, for example, LAN, cable, etc., and wireless networks, such as WLAN, cellular, or satellite. The I/O interface 606 may include one or more ports for connecting a number of devices to one another or to another server.

The memory 608 may includes computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 608 may include but not limited to the plurality of instruction(s), one or more task description charts (TDC) 610, and/or a status bit register 612. It will be understood by a person skilled in the art that the TDC 610 (used hereinafter) may refer to one or multiple such charts.

In accordance with the system 602, the instructions when initiated during the boot time causes the processor 604 to access the one or more TDC 610 stored in the computer system 602. The accessed TDC 610 may include, address information and selection information of a plurality of tasks of a booting process. The plurality of tasks may include all the tasks that are essentially to be performed for proper working of the computer system. The TDC 610 accessed is categorized based on the dependency of the plurality of tasks in the TDC 610. The TDC 610 is categorized to generate an independent task chart (ITC) and a dependent task chart (DTC). The ITC comprises of a set of tasks independent of any other tasks. The DTC comprises of a set of tasks having at least one dependency on any other task of the TDC. The system further categorizes the DTC into a dependent task char 1 (DTC 1) and a dependent task chart 2 (DTC 2). The DTC 1 comprises of the set of tasks from the DTC having at least one dependency on at least one task selected from the set of tasks of the ITC. The DTC 2 comprises of the set of tasks from the DTC having at least one dependency on at least one task selected from the set of tasks of the DTC 1 or at least one task selected from the set of tasks of the DTC 2.

Further, the system 602 selects the at least one task from the ITC for execution. The at least one task from the ITC is selected based on the selection information and more specifically based on the priority of the task with respect to the other tasks in the ITC. The selected at least one task is checked if it is executed already or not. If the task is not executed previously, the task is executed and then the next task based on the priority is selected from ITC for execution.

If the task is executed already, the next task based on the priority is selected from the ITC. The task execution status may be fetched from a status bit register 612 which stores all the information of the tasks executions. Accordingly the status bit register 612 is checked for the unexecuted tasks. In one example, the status bit mask may be used to mark the completion of the tasks on the target. When any task is marked completed or executed, a bit is set in the status bit mask which is maintained in the status bit register 612.

After the execution of all the tasks from the ITC, the system 602 selects the tasks from the DTC 1. All the tasks from the DTC 1 are selected based on the selection information of the task, and more specifically the priority of the tasks in the DTC 1. The priority of the DTC 1 is based on the dependency of the tasks from DTC 1 on the ITC. The system 602 selects the at least one task from the DTC 1 and checks if the selected task is already executed or not. If the task is not executed previously, the task is executed and then the next task based on the priority is selected from DTC 1 for execution. If the task is executed already, the next task based on the priority is selected from the DTC 1. Accordingly the status bit register 612 is checked for the unexecuted tasks. In one example, the status bit mask may be used to mark the completion of the tasks on the target. When any task is marked completed or executed, a bit is set in the status bit mask which is maintained in the status bit register 612.

After the execution of all the tasks from the DTC 1, the system 602 selects the tasks from the DTC 2. All the tasks from the DTC 2 are selected based on the selection information of the task, and more specifically the priority of the tasks in the DTC 2. The priority of the DTC 2 is based on the dependency of the tasks from DTC 2 on the DTC 1 and DTC 2. The system selects the at least one task from the DTC 2 and checks if the selected task is already executed or not. If the task is not executed previously, the task is executed and then the next task based on the priority is selected from DTC 2 for execution. If the task is executed already, the next task based on the priority is selected from the DTC 2. Accordingly the status bit register 612 is checked for the unexecuted tasks.

As the proposed invention is related to optimize a scheduling of parallel boot framework by providing offline scheduling algorithm, in one example, the TDC may be accessed by only one CPU at a time. The selection information may include a priority field representing a priority of the plurality of tasks and the at least one task from the plurality of tasks is selected based on ascending order of the priority by the at least one CPU. The selection information may also include a dependency field, a lock field, and a status field. All the tasks in the TDC may be categorized based on the dependency of the plurality of tasks. All the tasks in the ITC and DTC are arranged and executed in an ascending order of the priority of the set of tasks independent of other tasks. The other tasks on which the tasks of DTC may be dependent on may be any task of DTC 1 or DTC 2 or may be from the ITC. All the tasks present in the ITC are executed first, therein after the tasks of DTC 1 and then the tasks of DTC 2 are executed.

In one implementation, the information of task executed/completed may be maintained directly into the memory area, there may not be any need to maintain an explicit status bit register in the memory.

The offline scheduling algorithm may be the same algorithm as disclosed in PCT/CN2013/072764 or a person skilled in the art may utilize an existing algorithm for the offline scheduling of parallel boot framework.

Figure 7:
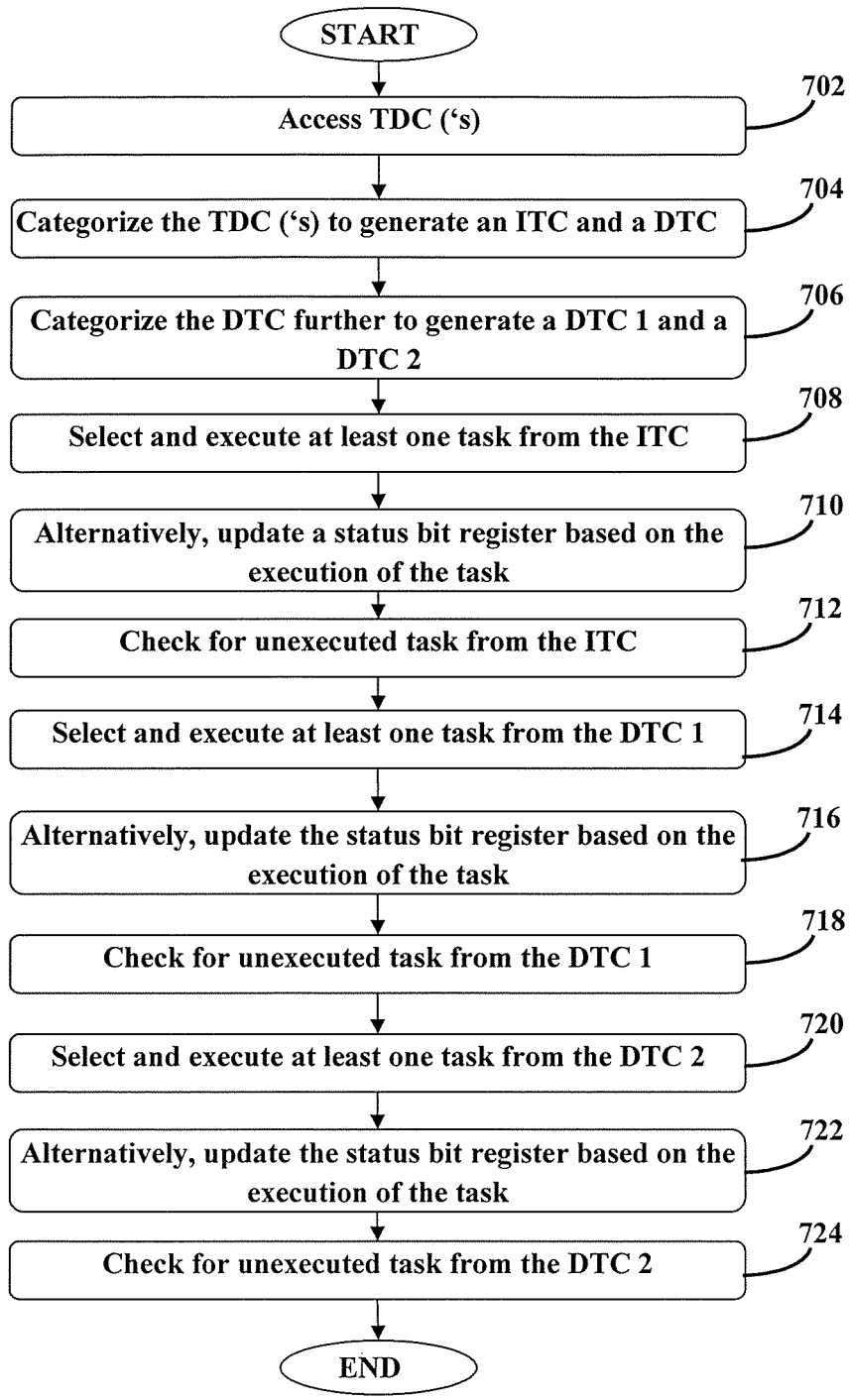
FIG. 7 illustrates a method of booting the computer system in accordance with an embodiment of the present subject matter.

Referring now to FIG. 7, a method booting the computer system is shown in accordance with an embodiment of the present subject matter. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described computer system 602.

At block 702, the TDC 610 generated by the use of offline scheduling algorithm may be accessed. In one implementation, the TDC 610 may be stored in the memory 608 and a task descriptor data structure is created based on each system. This offline chart will contain the task information. In the prior art, there was a single task description chart. The multiple charts are created offline based on the task attributes. Hence, the scheduling on the target is optimized. The TDC is accessed by only one CPU at a time. The TDC may include the address information and the selection information of a plurality of tasks of a booting process.

At block 704, the TDC 610 accessed is categorized to generate the ITC and the DTC. In one implementation, the TDC are categorized based on the dependency of the plurality of tasks. The ITC may include a set of tasks independent of other tasks and the DTC may include a set of tasks having at least one dependency on another task. The ITC wherein the tasks are arranged and executed in an ascending order of the priority of the set of tasks independent of other tasks. The set of tasks from the ITC are executed first. The DTC wherein the tasks are arranged in an ascending order of the priority of the set of tasks and the at least one dependency on the any other task.

At block 706, the DTC are further categorized to generate the DTC 1 and the DTC 2. In one implementation, the DTC includes the set of tasks from the DTC having at least one dependency on at least one task selected from the set of tasks of the ITC. Similarly, the DTC includes the set of tasks from the DTC having at least one dependency on at least one task selected from the set of tasks of the DTC 1 or at least one task selected from the set of tasks of the DTC 2. The set of tasks of DTC 1 are executed after the execution of the set of tasks from the ITC. The set of tasks from the DTC 2 are executed after the execution of the set of tasks from the ITC, and after the execution of the set of tasks from the DTC1. The set of tasks from the DTC 2 are executed based on the dependencies of the set of tasks in DTC 2.

In one implementation, as the DTC is arranged in an ascending order of the priority of the set of tasks and the at least one dependency on the other task. The other task is at least one task selected from a set of tasks of the ITC, or a set of tasks of the DTC or a set of tasks of the DTC 2.

At the step 708, the at least one task from the ITC is selected. The tasks from the ITC are selected based on the selection information which is stored in the TDC and thereby in ITC. The selected tasks are then executed. After the execution of the selected task, the system checks for the at least one unexecuted task from the ITC which may be in the priority after the executed task. The unexecuted task may be selected based on a status bit register maintained in the memory of the system.

Alternatively, at the step 710, after each execution of the selected task of the ITC the status bit register maintained is updated. A status bit mask which may be used to mark the completion of the tasks on the target is also maintained in the status bit register. When the task is marked executed or completed, a bit is set in the status bit mask.

At the step 712, all the tasks available in the ITC are checked for its execution. If any task is not executed, the task is selected and then executed. If all the tasks in ITC are executed then the system may select the tasks form DTC 1 for its execution.

At the step 714, after the execution of all the tasks of ITC, the at least one task from the DTC 1 is selected. The tasks from the DTC 1 are selected based on the selection information which is stored in the TDC and thereby in DTC 1. The selected tasks are then executed. After the execution of the selected task, the system checks for the at least one unexecuted task from the ITC which may be in the priority after the executed task. The unexecuted task may be selected based on a status bit register maintained in the memory of the system. The set of tasks from the DTC 1 are executed after the execution of the set of tasks from the ITC.

Alternatively, at the step 716, after each execution of the selected task of the DTC 1 the status bit register maintained is updated. A status bit mask which may be used to mark the completion of the tasks on the target is also maintained in the status bit register. When the task is marked executed or completed, a bit is set in the status bit mask.

At the step 718, all the tasks available in the DTC 1 are checked for its execution. If any task is not executed, the task is selected and then executed. If all the tasks from DTC 1 are executed then the system may select the task form DTC 2 for its execution.

At the step 720, after the execution of all the tasks of DTC 1, the at least one task from the DTC 2 is selected. The tasks from the DTC 2 are selected based on the selection information and also the dependency on at least one task selected from the set of tasks of the DTC 1 or at least one task selected from the set of tasks of the DTC 2, which is stored in the TDC and thereby in DTC 2. The selected tasks are then executed. After the execution of the selected task, the system checks for the at least one unexecuted task from the ITC which may be in the priority after the executed task. The unexecuted task may be selected based on a status bit register maintained in the memory of the system. The set of tasks from the DTC 2 are executed after the execution of the set of tasks from the DTC 1 and the ITC.

Alternatively at the step 722, after each execution of the selected task of the DTC 2 the status bit register maintained is updated. A status bit mask which may be used to mark the completion of the tasks on the target is also maintained in the status bit register. When the task is marked executed or completed, a bit is set in the status bit mask.

At the step 722, all the tasks available in the DTC 2 are checked for its execution. If any task is not executed, the task is selected and then executed.

Figure 8:
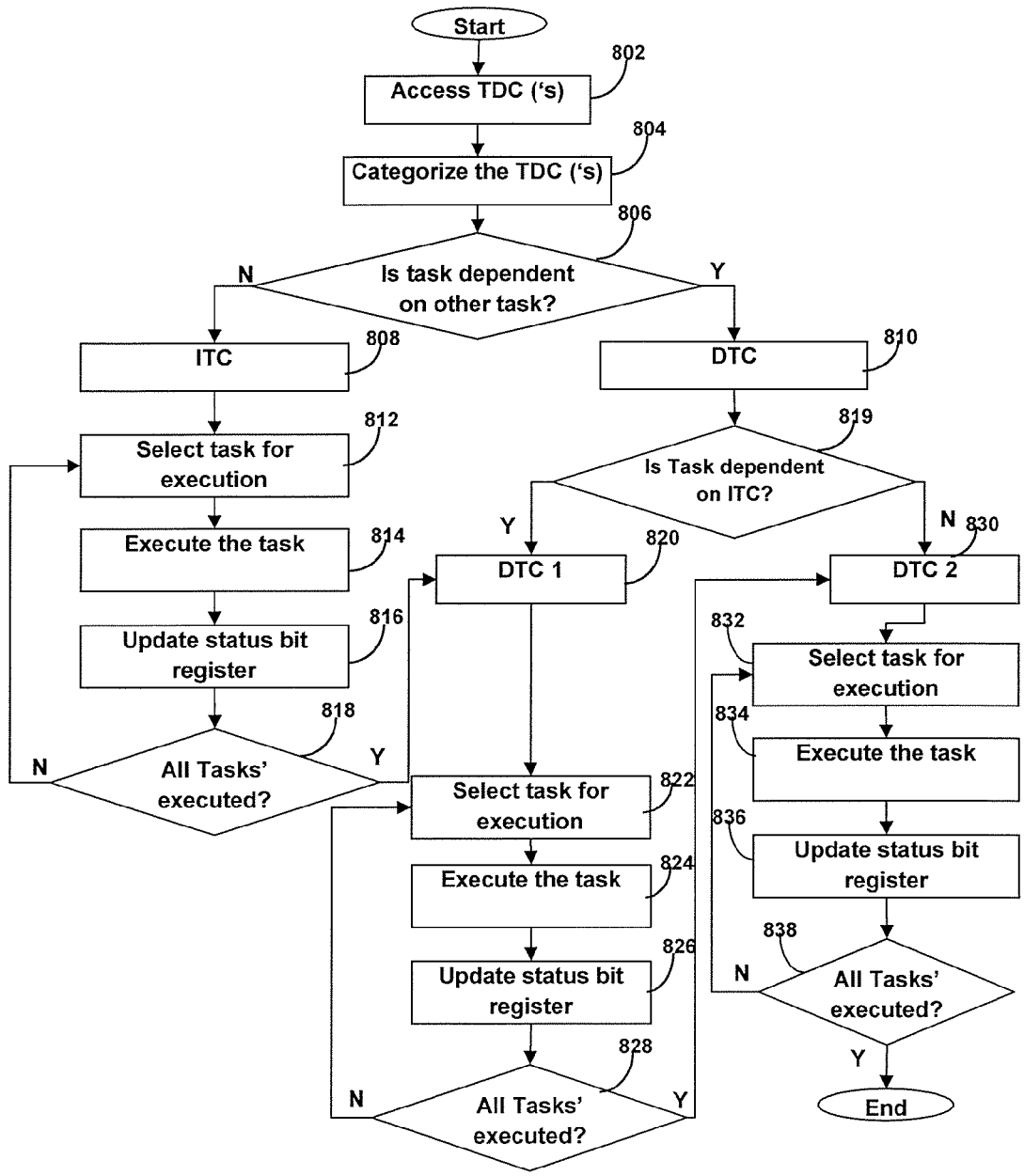
FIG. 8 illustrates a flow chart for executing the tasks for booting the computer system in accordance with an embodiment of the present subject matter.

Referring now to FIG. 8, the flow chart for executing the tasks for booting the computer system is shown, in accordance with an embodiment of the present subject matter.

At step 802, the TDC 610 is accessed from the memory 608 where it is stored. The TDC 610 may include plurality of tasks stored therein.

At step 804, the TDC 610 is selected for categorization.

At step 806, all the tasks from the TDC 610 are checked for the dependency on another task.

At step 808, if any task is not dependent on another task, the task is categorized in the ITC.

At step 810, if any task is dependent on another task, the task is categorized in the DTC.

At step 812, at least one task form the ITC is selected for the execution. All the tasks in the ITC are arranged in an ascending order of the priority of the set of tasks independent of other tasks.

At step 814, at least one selected task form the ITC is executed. All the tasks in the ITC are executed based on the arrangement in an ascending order of the priority of the set of tasks independent of other tasks.

At step 816, the status bit register is updated based on the execution of the task. After each execution of the selected task from the ITC the status bit register maintained is updated. A status bit mask which may be used to mark the completion of the tasks on the target is also maintained in the status bit register. When the task is marked executed or completed, a bit is set in the status bit mask.

At step 818, the system 602 may check for the execution of all the tasks in the ITC. If all the tasks are executed in the ITC the systems selects tasks form the DTC 1. If any task is not executed form the ITC the step 812 to 816 are performed again.

At step 819, all the tasks form the DTC are checked if the tasks are dependent on ITC or on.

At step 820, if the tasks in the DTC are dependent on another task in ITC, the respective tasks are categorized under the DTC 1.

At step 822, at least one task form the DTC 1 is selected for the execution. All the tasks in the DTC 1 are arranged in an ascending order of the priority of the set of tasks independent of any other tasks.

At step 824, at least one selected task form the DTC 1 is executed. All the tasks in the DTC 1 are executed based on the arrangement in an ascending order of the priority of the set of tasks dependent on the tasks of the ITC.

At step 826, the status bit register is updated based on the execution of the task. After each execution of the selected task from the DTC 1 the status bit register maintained is updated. The status bit mask which may be used to mark the completion of the tasks on the target is also maintained in the status bit register. When the task is marked executed or completed, a bit is set in the status bit mask.

At step 828, the system 602 may check for the execution of all the tasks in the DTC 1. If all the tasks are executed in the DTC 1 the systems selects tasks form the DTC 2. If any task is not executed form the DTC 1 the step 822 to 826 are performed again.

At step 830, if the tasks in the DTC are not dependent on another task in ITC, the respective tasks is categorized under the DTC 2.

At step 832, at least one task form the DTC 2 is selected for the execution. All the tasks in the DTC 1 are arranged in an ascending order of the priority of the set of tasks and dependency on other tasks that may be on the tasks of DTC 1 or on DTC2.

At step 834, at least one selected task form the DTC 2 is executed. All the tasks in the DTC 1 are executed.

At step 836, the status bit register is updated based on the execution of the task. After each execution of the selected task from the DTC 2 the status bit register maintained is updated. The status bit mask which may be used to mark the completion of the tasks on the target is also maintained in the status bit register. When the task is marked executed or completed, a bit is set in the status bit mask.

At step 838, the system 602 may check for the execution of all the tasks in the DTC 2. If all the tasks are executed in the DTC 2 the systems exits to perform normal operation after booting process. If any task is not executed form the DTC 2 the step 832 to 836 are performed again.

Figure 9:
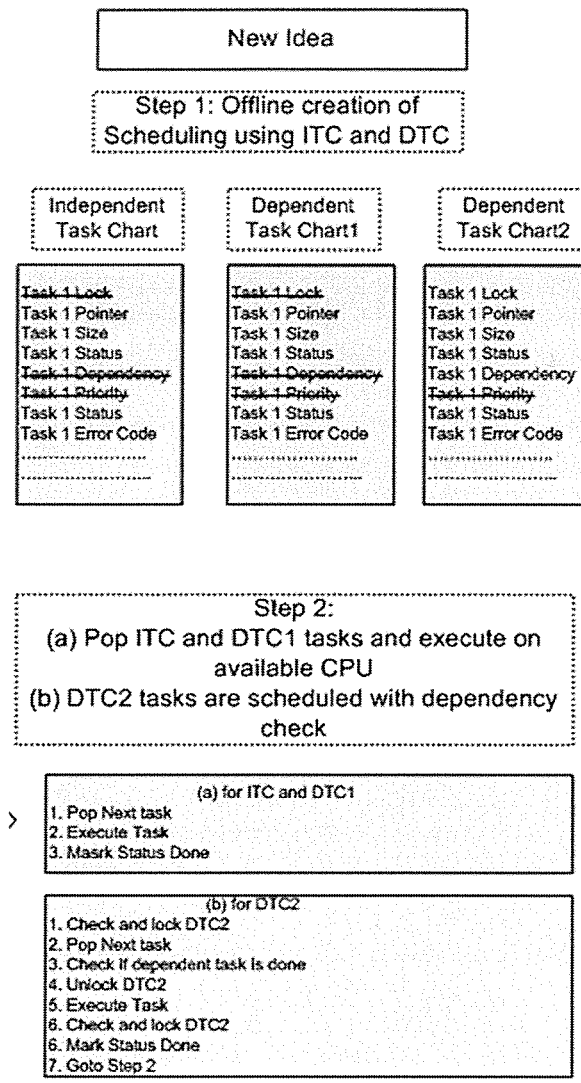
FIG. 9 illustrates an overall process in accordance with an embodiment of the present subject matter.

Referring now to FIG. 9, there is illustrated an overall processing in accordance with an embodiment of the present subject matter. In one implementation, the optimization of the scheduler on a target or the CPU is obtained by three steps mentioned below:

1. Process the TDC offline and create the scheduling queue for all the boot up tasks
2. On target pop and execute the tasks
3. Status bit register for completion of each task on a specific core In one embodiment of the present invention, the scheduler optimization may be achieved by following the below mentioned steps performed by the system:

1. The TDC (Task Descriptor Chart) is processed offline to create two sets of scheduling charts.
2. The first set of scheduling chart ITC (Independent Task Chart) contains all the tasks which do not depend on other tasks for execution. These are placed in order as per their priority. These tasks eventually can be scheduled on target in parallel, without checking their priority or dependency. On successful execution their status would be set to reflect to reflect their completion.
3. The second set of scheduling chart (Dependent Task chart) contains all the remaining tasks in priority sequence with their dependency information. They are further divided on two sets DTC1 and DTC2. DTC1 are the tasks sets which are dependent on ITC tasks. Like ITC, DTC1 do not have any dependency information as they will be executed only after ITC is executed and no dependency exist after that.
4. The DTC 2 is the task sets which are dependent on tasks in either of ITC, DTC 1 or DTC 2. They have dependency info.
5. On target or the processing system, the independent task chart, would be first used and executed to completion in parallel. This removes the overhead for checks on their priority and dependency.
6. On completion of all tasks from ITC, the scheduler will shift to DTC for further execution. The first DTC 1 will be executed, as after execution of ITC, the dependencies are gone.
7. On completion of DTC 1, the scheduler shifts to DTC 2. Here the dependency of each task is checked and executed accordingly.
8. The tasks are maintained in their priority order and thus on target; they are available as in queue (FIFO). For each available CPU/core, these tasks are popped and executed.
9. Status bit register is maintained for completion of each task on a specific core.

Due to the offline processing of the TDC, the system provides an efficient solution for offline memory budgeting, which is achieved by:

1. As tasks sets are known prior to execution, the memory requirement for these tasks is available beforehand.
2. The Memory initialization task can be optimized in phases to utilize this information on a multi processor system
3. The memory requirement on the target could be budgeted better.
4. The offline scheduling chart help to create the ITC and DTC based on the dependency and priority. The DTC can be at different levels to manage all the tasks so as to reduce the scheduling overhead on the target.
5. The system further provides the memory requirement information based on the ITC and DTC. Also, the offline boot time memory budgeting inputs can be derived. This will help to avoid the on target memory handling and hence avoid the overhead.

In one example, the task execution sequence is calculated offline by the following steps:
Illustration:
Number of tasks=N
Prior Art
Time for pre+post processing=XP (this is not a constant)
Time for actual task execution=XE (this is not a constant)
Total Time needed=N(XP+XE)
With Scheduler Optimization:
Time for pre+post processing=0.1XP (this is not a constant)
Time for actual task execution=XE (this is not a constant)
Total Time needed=N(0.1XP+XE)
Example: N=50, XP=0.5 s, XE=3 s
Prior Art: 50(0.5+3)=175 s
With Scheduler Optimization: 50(0.1×0.5+3)=152.5 s
Improvement=22.5 s (overall) [12.86%]
[Overall % improvement depends on N, XP and XE]

Figure 10:
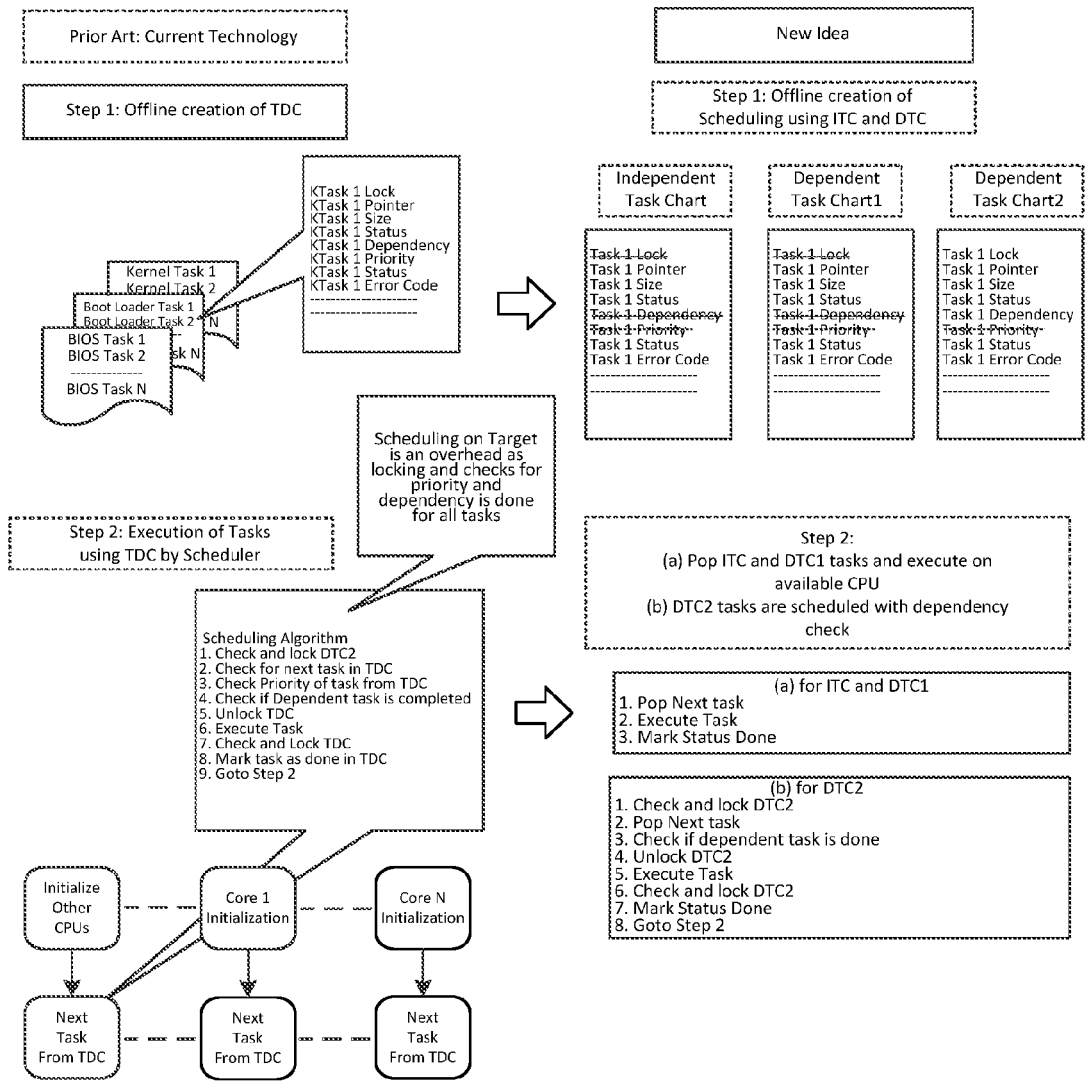
FIG. 10 illustrates a comparison between PCT/CN2013/072764 and the overall technique of the present subject matter.

Referring now to FIG. 10, there is illustrated a comparison between the overall processing in PCT/CN2013/072764 and the overall technique described herein in accordance with an embodiment of the present subject matter.

Figure 11:
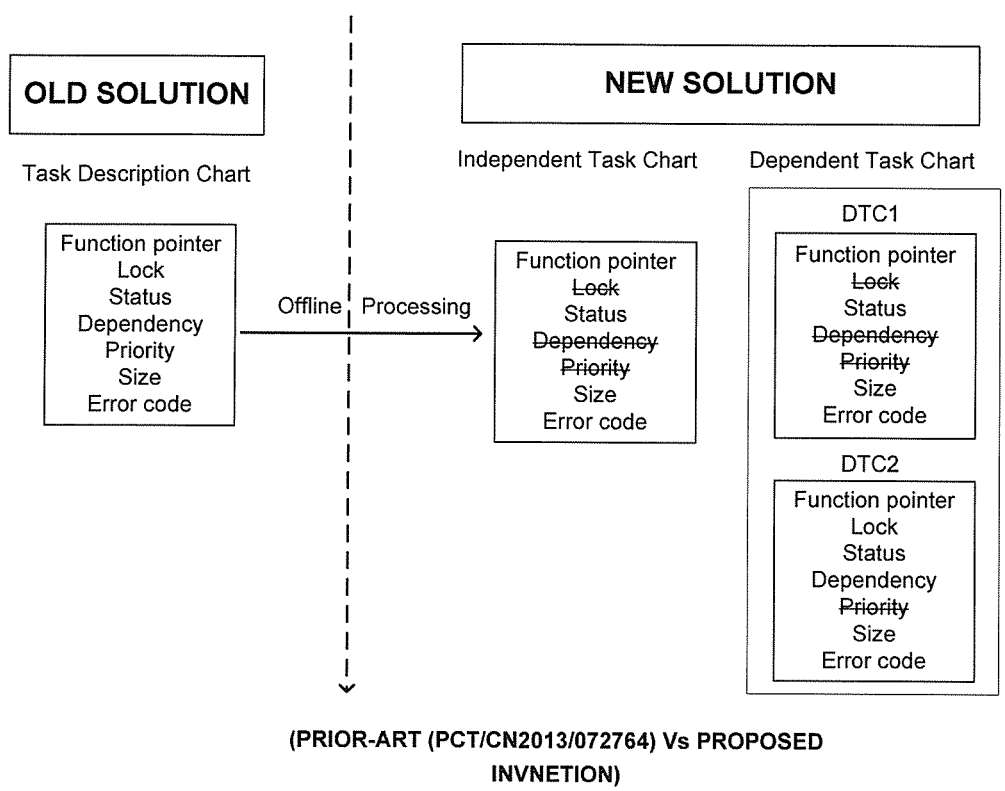
FIG. 11 illustrates a prior art TDC shown in PCT/CN2013/072764 and the categorization of TDC of the present subject matter.

Referring now to FIG. 11, there is illustrated a TDC described in PCT/CN2013/072764 and the TDC scheme described in accordance with an embodiment of the present subject matter.

Figure 12:
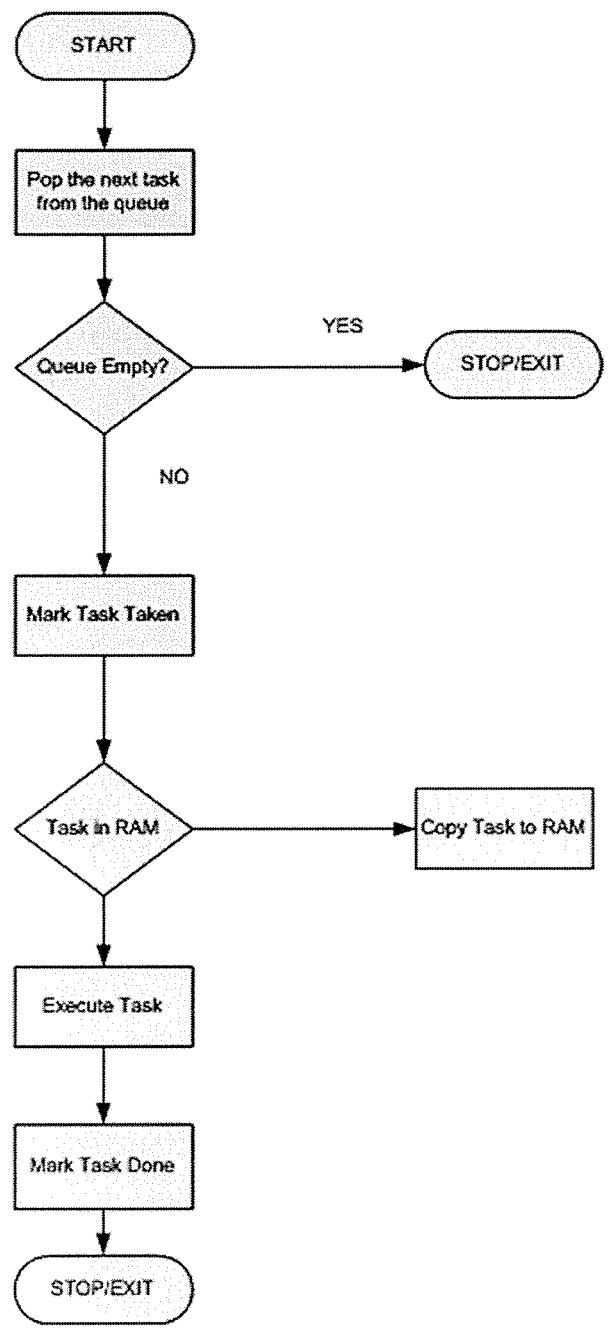
FIG. 12 illustrates a flowchart depicting an execution process of the present subject matter.

Referring now to FIG. 12, there is illustrated a flowchart depicting an execution process in accordance with an embodiment of the present subject matter. In one example, the tasks are arranged in the queue in First-in-First-Out (FIFO) fashion. The execution process starts by popping the task form the queue. If the queue is empty the process ends and enters into the after booting process of the system. If the queue is not empty, the system marks the popped task as taken or executing. The processors executed the tasks and after the execution of the task the task is marked as done or executed.

Figure 13:
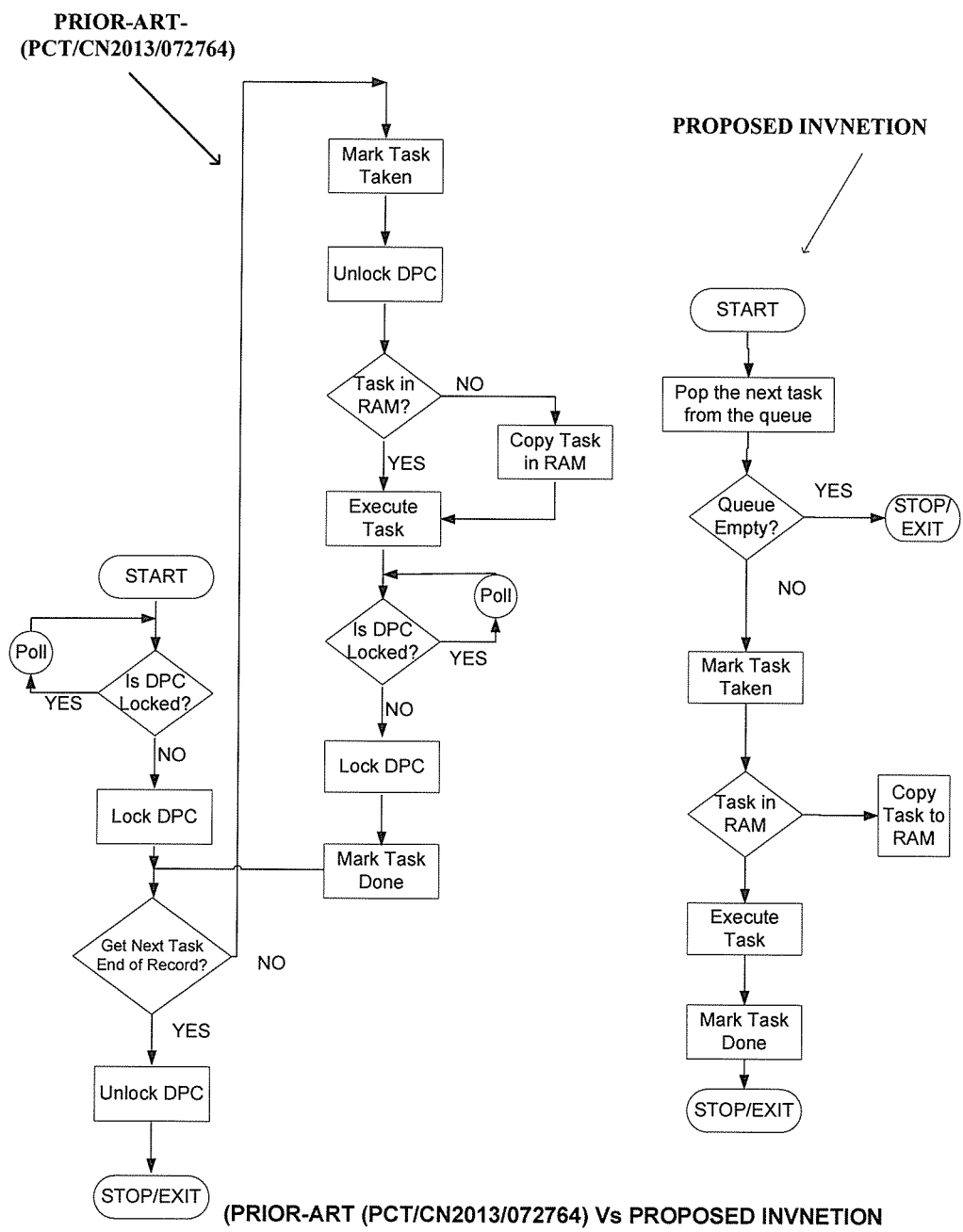
FIG. 13 illustrates a comparison of execution process disclosed in PCT/CN2013/072764 and the execution process of the present subject matter.

Referring now to FIG. 13, there is illustrated a comparison of the execution process described in PCT/CN2013/072764 and the execution process in accordance with an embodiment of the present subject matter.

Although implementations for booting a computer system with at least one central processing unit (CPU), in response to a boot command have been described in language specific to structural features and/or methods, it is to be understood that the appended claims are not necessarily limited to the specific features or methods described. Rather, the specific features and methods are disclosed as examples of implementations for booting a computer system with at least one central processing unit (CPU), in response to a boot command.

Exemplary embodiments discussed above may provide certain advantages. Though not required to practice aspects of the disclosure, these advantages may include:
1. The offline scheduling enables the system to avoid overhead of dependency and priority lookup from TDC to provide a better performance.
2. As compared to previous solution/s, for tasks in ITC and DTC1, getting next record is faster as it is just a pop operation from a queue. The operation for traversing the TDC, checks for priority and dependency are not required, thus reducing these overhead.
3. As compared to previous solution/s, for tasks in ITC and DTC1, locking/unlocking of TDC, prior to and post execution of tasks is not required. Also wait on a locked TDC is done away with.
4. As compared to previous solution/s, for tasks in DTC2, check for priority is done away with.
5. The memory management can utilize the scheduling information to initialize required memory in phases.
6. Further, the offline scheduling idea can be applied for embedded or predefined task set devices.
7. This proposed solution can be used for reducing the boot time of any system which has multiple cores or multiple processors with multiple tasks during the boot process.

Finally, it should be understood that the above embodiments are only used to explain, but not to limit the technical solution of the present application. Despite the detailed description of the present application with reference to above preferred embodiments, it should be understood that various modifications, changes or equivalent replacements can be made by those skilled in the art without departing from the scope of the present application and covered in the claims of the present application. Further, the concept of ITC and DTC can be extended based on the target system. In one example, based on the overall boot tasks set, the architect can decide on the ITC and DTC combinations along with core affinity (if any) and optimize the boot scheduling.

What is claimed is:

1. A computer implemented method, in response to a boot command, for booting a computer system connected to multiple initialized Central Processing Units (CPUs), the computer implemented method comprising:
    accessing a task description chart (TDC) stored in the computer system, wherein the TDC includes a plurality of tasks of a booting process, wherein each task of the plurality of booting process includes selection information of the plurality of tasks of the booting process, comprising a priority field, at least one dependency field, a lock field, and a status field;
    categorizing, based on the selection information for the plurality of tasks of the booting process, the accessed TDC to generate:
        an independent task chart (ITC) comprising a set of independent tasks independent of any other tasks, and
        a dependent task chart (DTC) comprising a set of dependent tasks having at least one dependency on another task, wherein the DTC is further categorized into:
            a dependent task chart 1 (DTC 1) comprising a first set of dependent tasks from the DTC having at least one dependency on at least one task selected from the set of independent tasks of the ITC, and
            a dependent task chart 2 (DTC 2) comprising a second set of dependent tasks from the DTC having at least one dependency on the at least one DTC1 task selected from the first set of dependent tasks of the DTC 1 or at least one task selected from the second set of dependent tasks of the DTC 2;

executing the set of tasks from the ITC by selecting at least one ITC task from the ITC based on the selection information, executing the at least one ITC task, updating a status bit register for completion of the at least one ITC task, and checking for at least one unexecuted task from the ITC, thereby when all tasks in the set of independent tasks of the ITC are completed, selecting at least one DTC 1 task from the DTC 1 based on the selection information, executing the at least one DTC1 task, updating the status bit register for completion of the at least one DTC 1 task, and checking for at least one unexecuted task from the DTC 1, and thereby when all tasks in the first set of dependent tasks of the DTC 1 are completed, selecting at least one DTC 2 task from the DTC 2 based on the selection information, executing the at least one DTC 2 task based on the at least one dependency on at least one task selected from the first set of dependent tasks of the DTC 1 or at least one task selected from the second set of dependent tasks of the DTC 2, updating the status bit register for completion of the at least one DTC 2 task, and checking for at least one unexecuted task from the DTC 2.

2. The computer implemented method as claimed in claim 1, wherein the selection information comprises the priority field representing a priority of the plurality of tasks, and the at least one task is selected based on the selection information arranged in an ascending order of the priority by the multiple CPUs.

3. The computer implemented method as claimed in claim 1, wherein the selection information comprises at least one of the dependency field, the lock field, or the status field.

4. The computer implemented method as claimed in claim 1, wherein the TDC is categorized based on the dependency of the plurality of tasks.

5. The computer implemented method as claimed in claim 1, wherein the ITC is arranged and executed in an ascending order of the priority of the set of independent tasks.

6. The computer implemented method as claimed in claim 1, wherein the DTC is arranged in an ascending order of the priority of the set of dependent tasks and the at least one dependency on the other task.

7. The computer implemented method as claimed in claim 6, wherein the other task is at least one task selected from the set of independent tasks of the ITC, or from the first set of dependent tasks of the DTC 1, or from the second set of dependent tasks of the DTC 2.

8. The computer implemented method as claimed in claim 1, wherein the set of independent tasks from the ITC are executed first, the first set of dependent tasks from the DTC 1 are executed after the execution of the set of independent tasks from the ITC, and the second set of dependent tasks from the DTC 2 are executed after the execution of the first set of dependent tasks from the DTC1.

9. The computer implemented method as claimed in claim 1, wherein the second set of tasks from the DTC 2 are executed based on the dependencies of the set of tasks.

10. The computer implemented method as claimed in claim 1, further comprising:

maintaining the status bit register for completion of each task and to check the at least one unexecuted task, wherein the status bit register is stored in a memory.

11. A computer system, comprising:
multiple Central Processing Units (CPUs);
a memory coupled to the multiple CPUs for executing a plurality of instructions stored in the memory, the execution of the instructions causing the multiple CPUs to:

access a task description chart (TDC) stored in the computer system, wherein the TDC includes a plurality of tasks of a booting process, wherein each task of the plurality of tasks of the booting process includes selection information of the plurality of tasks of the booting process, comprising a priority field, at least one dependency field, a lock field, and a status field;

categorize, based on the selection information for the plurality of tasks of the booting process, the accessed TDC to generate:

an independent task chart (ITC) comprising a set of independent tasks independent of any other tasks, and a dependent task chart (DTC) comprising a set of dependent tasks having at least one dependency on another task, wherein the DTC is further categorized into:

a dependent task chart 1 (DTC 1) comprising a first set of dependent tasks from the DTC having at least one dependency on at least one task selected from the set of independent tasks of the ITC, and a dependent task chart 2 (DTC 2) comprising a second set of dependent tasks from the DTC having at least one dependency on the at least one DTC 1 task selected from the first set of dependent tasks of the DTC 1 or at least one task selected from the second set of dependent tasks of the DTC 2, execute the set of tasks from the ITC by selecting at least one ITC task from the ITC based on the selection information, execute the at least one ITC task, updating a status bit register for completion of the at least one ITC task, and check for at least one unexecuted task from the ITC, thereby when all tasks in the set of independent tasks of the ITC are completed, select at least one DTC 1 task from the DTC 1 based on the selection information, execute the at least one DTC 1 task, updating the status bit register for completion of the at least one DTC 1 task, and check for at least one unexecuted task from the DTC 1, and thereby when all tasks in the first set of dependent tasks of the DTC 1 are completed, select at least one DTC 2 task from the DTC 2 based on the selection information, execute the at least one DTC 2 task based on the at least one dependency on at least one task selected from the first set of dependent tasks of the DTC 1 or at least one task selected from the second set of dependent tasks of the DTC 2, updating the status bit register for completion of the at least one DTC 2 task, and check for at least one unexecuted task from the DTC 2.

12. The computer system as claimed in claim 11, wherein the selection information comprises the priority field representing a priority of the plurality of tasks, and the at least one task is selected based on the selection information arranged in an ascending order of the priority by the multiple CPUs.

13. The computer system as claimed in claim 11, wherein the selection information comprises at least one of the dependency field, the lock field, or the status field.

14. The computer system as claimed in claim 11, wherein the TDC is categorized based on the dependency of the plurality of tasks.

15. The computer system as claimed in claim 11, wherein the ITC is arranged and executed in an ascending order of the priority of the set of independent tasks.

16. The computer system as claimed in claim 11, wherein the DTC is arranged in an ascending order of the priority of the set of dependent tasks and the at least one dependency on the other task.

17. The computer system as claimed in claim 16, wherein the other task is at least one task selected from the set of independent tasks of the ITC, from the first set of dependent tasks of the DTC 1, or from the second set of dependent tasks of the DTC 2.

18. The computer system as claimed in claim 11, wherein the set of independent tasks from the ITC are executed first, the first set of dependent tasks from the DTC 1 are executed after the execution of the set of independent tasks from the ITC, and the second set of dependent tasks from the DTC 2 are executed after the execution of the first set of dependent tasks from the DTC1.

19. The computer system as claimed in claim 11, wherein the second set of dependent tasks from the DTC 2 are executed based on the dependencies of the second set of dependent tasks.

20. The computer system as claimed in claim 11, wherein the status bit register is maintained for completion of each task and to check the at least one unexecuted task, wherein the status bit register is stored in the memory.

\* \* \* \* \*